(12) United States Patent
Magno

(10) Patent No.: US 7,487,713 B2
(45) Date of Patent: Feb. 10, 2009

(54) MECHANICALLY AND HYDRODYNAMICALLY OPERATED BREWING UNIT

(75) Inventor: Alessandro Magno, Brembate Sopra (IT)

(73) Assignee: N&W Global Vending S.p.A., Bergamo (IT)

( * ) Notice: Subject to any disclaimer, the term of this patent is extended or adjusted under 35 U.S.C. 154(b) by 625 days.

(21) Appl. No.: 10/537,312

(22) PCT Filed: Nov. 13, 2003

(86) PCT No.: PCT/EP03/12681

§ 371 (c)(1),
(2), (4) Date: Jun. 2, 2005

(87) PCT Pub. No.: WO2004/049878

PCT Pub. Date: Jun. 17, 2004

(65) Prior Publication Data

US 2006/0075902 A1    Apr. 13, 2006

(30) Foreign Application Priority Data

Dec. 2, 2002 (IT) ............................ PN2002A0093

(51) Int. Cl.
A47J 31/40 (2006.01)
(52) U.S. Cl. ..................................... 99/302 P; 99/289 R
(58) Field of Classification Search ................ 99/302 P, 99/289 R
See application file for complete search history.

(56) References Cited

U.S. PATENT DOCUMENTS

| 3,269,298 | A | 8/1966 | Grundmann |
| 6,431,055 | B2 * | 8/2002 | Bonanno ................ 99/302 P |
| 6,510,783 | B1 * | 1/2003 | Basile et al. ............. 99/289 R |
| 6,584,888 | B2 * | 7/2003 | Cortese ................... 99/289 R |
| 2001/0011502 | A1 | 8/2001 | Bonanno |
| 2002/0088348 | A1 | 7/2002 | Cortese |

FOREIGN PATENT DOCUMENTS

| DE | 196 47 385 C1 | 8/1998 |
| EP | 0 948 926 B1 | 10/1999 |
| EP | 1 121 882 B1 | 8/2001 |
| EP | 1 219 217 B1 | 7/2002 |

\* cited by examiner

*Primary Examiner*—Reginald L Alexander
(74) *Attorney, Agent, or Firm*—Wenderoth, Lind & Ponack, L.L.P.

(57) ABSTRACT

A mechanically and hydrodynamically operated brewing unit (1) for automatic beverage vending machines includes a rotatable base (3) provided with a compartment (15) that acts as a brewing chamber, means to let water under pressure into said compartment, means to connect said compartment with the point at which the brewed beverage is dispensed, and a brewing head (4). This brewing head is comprised of a hollow containment structure (279), a first hollow piston (28) that is housed in said containment structure movably relative thereto, a second piston (29) that is accommodated in said first piston movably relative thereto, and elastic means (30) contrasting the movement of said second piston. The brewing unit is characterized in that said first piston and said second piston are operated by the direct action of a fluid under pressure.

19 Claims, 5 Drawing Sheets

MECHANICALLY AND HYDRODYNAMICALLY OPERATED BREWING UNIT

FIELD OF THE INVENTION

The present invention refers to a mechanically and hydrodynamically operated brewing unit for automatic beverage vending machines, which is adapted to prepare the beverages to be dispensed starting from so-called capsules, preferably hermetically sealed ones, containing the raw material to be brewed.

BACKGROUND OF THE INVENTION

In the course of the last few years, there has been a growing use, in automatic vending machines for preparing and dispensing beverages, of so-called capsules, in particular such capsules of a hermetically sealed type, which contain a raw material ready for brewing. These sealed capsules are constituted by semi-rigid envelopes provided with a collet, which create a physical barrier separating their contents from the surrounding ambient. In beverage vending machines, capsules of this kind are certainly by far preferably over both the traditional pre-filled filters, i.e. filters that are filled in advance with the raw material for brewing, and those capsules that are constituted by a semi-rigid envelope comprising a pair of surfaces acting as filtering elements, i.e. elements that enable the brew to pass therethrough, while retaining the raw material within the same capsule. The main advantage deriving from the afore-mentioned hermetically sealed capsules lies in the fact that the raw material contained in these capsules is effectively and reliably preserved from any contact with the outside ambient, thereby ensuring a maximum extent of hygiene, as well as an optimum preservation of the flavor, fragrance and the other properties of the content thereof over prolonged periods of time. This is basically why this kind of packaging is highly preferable, especially in those vending machines, which prepare and dispense beverages of an aromatic kind, such as for instance coffee, tisanes or other kinds of hot infusions.

Largely known in the art is the fact that the use of sealed capsules in automatic vending machines requires these machines to be provided with brewing units that comprise devices adapted to accommodate and hold the capsules themselves, as well as devices adapted to ensure the water-tightness of the brewing chamber and devices adapted to pierce the capsule in order to enable water to come into contact with the raw material contained therein. When a brewing unit of the just described kind is in operation, some of the members constituting the same unit are set in motion, so as to displace relative to each other, by means of appropriate mechanical devices that are usually operated by an electric motor. The fact that such brewing units are operated solely by mechanical members and devices is disadvantageous in that the operating accuracy of such mechanical members, and as a result the proper production of the beverage, are strongly dependent on the manufacturing and assembly tolerances of the various mechanical parts involved, as well as the increasing wear-down state of the materials which said mechanical parts are made of. To particularly suffer from this drawback is chiefly the mating accuracy of those elements constituting the brewing unit, which are temporarily associated with each other in order to tightly seal the brewing chamber during the beverage preparation process. It can be readily appreciated that, if such a mating accuracy is not perfect, or becomes imperfect after a certain number of working cycles of the brewing unit, there will occur leakage problems involving both liquid and raw material, which eventually affect the quality of the beverage being produced. Another device that is particularly affected by this drawback is one that causes the capsule to be pierced. In prior-art brewing units, the piercing operation is performed with the aid of means that press the capsule against a device comprising one or more projections that are so shaped as to be able to pierce the material which the capsule is made of. Even in this case, it can be readily appreciated that if the pressing action intervening between the capsule and the piercing device cannot be brought about to full intensity, i.e. loses some of its force due to the inaccuracy of the mechanical devices moving or actuating the various parts forming the brewing unit, the resulting beverage will not be produced correctly.

Known from the disclosure in U.S. Pat. No. 6,431,055 is a brewing unit for the preparation of espresso coffee, the component parts of which are actuated by the action of pressurized water from the machine pump without any further electric or pneumatic control being used. The brewing unit described in this patent publication is designed to work with the use of loose coffee powder or filter bags that are pre-filled with raw material, of the type of those provided in the form of a capsule constituted by a semi-rigid envelope with a base and a bottom acting as a filter. Further to the already mentioned poor preservation of the raw material contained in capsules provided with filtering surfaces, the brewing unit described in U.S. Pat. No. 6,431,055 can by no means operate by using the more advantageous capsules of the hermetically sealed type, since no device or member adapted to enable the capsules to be dully pierced is provided therein.

SUMMARY OF THE INVENTION

It therefore is the object of the present invention to provide a mechanically and hydrodynamically operated brewing unit for beverage vending machines, which is capable of carrying out the preparation of beverages with the aid of capsules, preferably hermetically sealed ones, containing the raw material to be brewed, while doing away with the drawbacks and disadvantages of prior-art brewing units of this kind.

Within this general object, it is a purpose of the present invention to provide a brewing unit, which is capable of operating effectively, although not limitatively, with capsules of the hermetically sealed type.

Another purpose of the present invention is to provide a brewing unit, the operation of which is fully independent of manufacturing and assembly tolerances of the various mechanical component parts, as well as of the progressing wear and tear of the materials which said component parts are made of, the brewing unit itself being so sized and designed as to be extremely compact and capable of being accommodated in a beverage vending machine of the usual kind.

BRIEF DESCRIPTION OF THE DRAWINGS

According to the present invention, these aims are reached in a capsule feeding apparatus for beverage vending machines incorporating the characteristics as described in a first aspect of the present invention. Features and advantages of the present invention will anyway be more readily understood from the description that is given below by way of non-limiting example with reference to the accompanying drawings, in which.

DETAILED DESCRIPTION OF THE INVENTION

Figure 1:
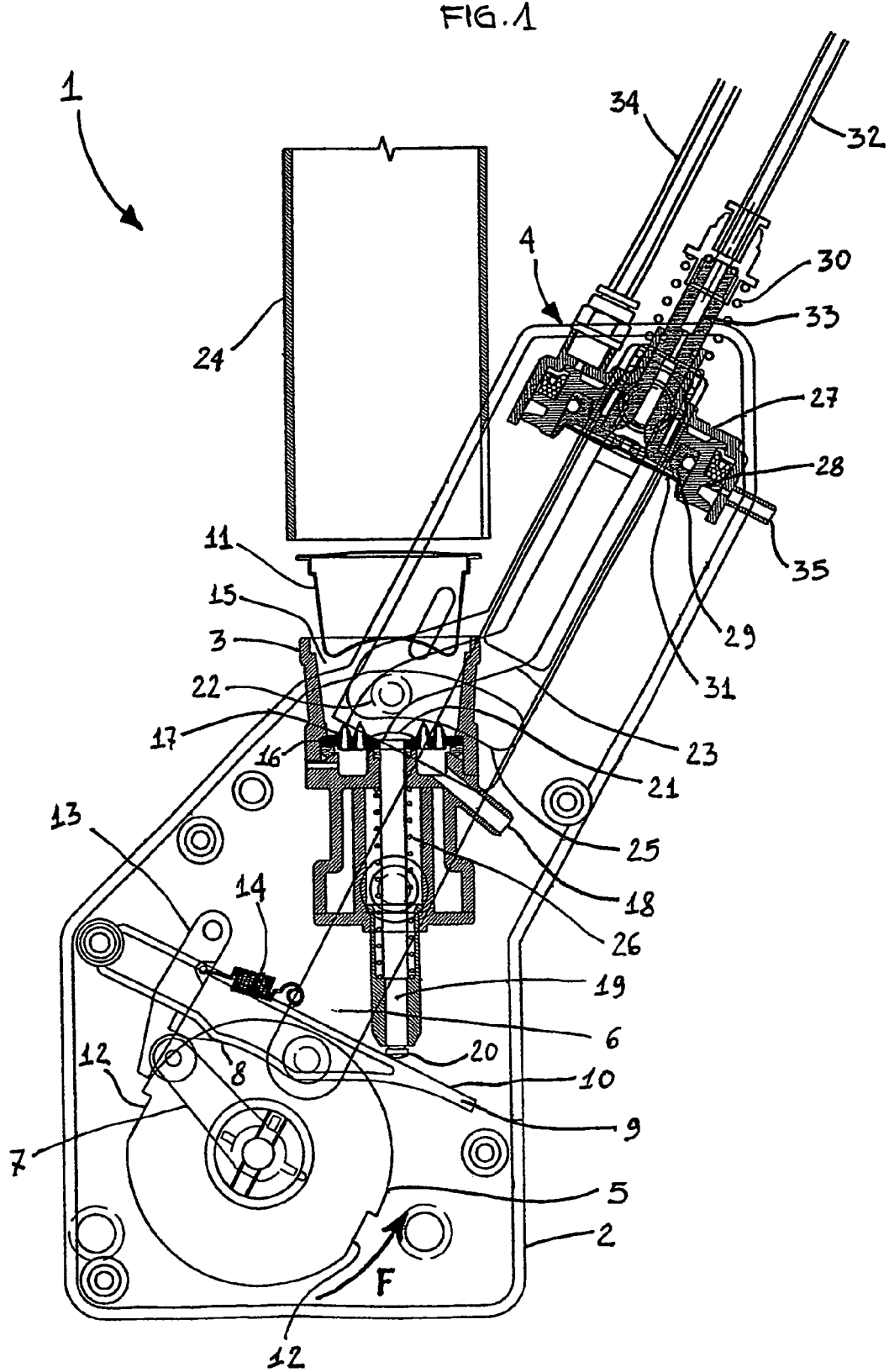
FIG. 1 is a cross-sectional view of the brewing unit in a phase of the operation thereof.

FIG. 1 illustrates a brewing unit 1 for automatic beverage vending machines, which is constituted by a box-like containment body 2 acting as an outer casing for the entire brewing unit 1, a base 3 and a brewing head 4. Within the box-like containment body 2, in addition to the base 3 and the brewing head 4, there are also housed the mechanical members that form a kinematic chain adapted to operate both the base 3 and the brewing head 4. In particular, these mechanical operating members include a crank 5, to which there is rotatably connected the first end portion of a connecting rod 6, the second end portion of the connecting rod 6 being connected to the brewing unit 4. Firmly joined to the crank 5 there is a cam 7, which interacts with the lower contour 8 of an ejection lever 9 provided with an upper contour 10 that controls the ejection of the capsule 11 from the base 3. In the crank 5 there are provided two recesses 12 adapted to be engaged by a detent lever 13 that is rotatably connected to the box-like containment body 2 and prevents the crank 5 from rotating in either one of the two possible directions of rotation during the beverage preparation phases. A movement of this detent lever 13 is opposed by a first spring 14, through which said detent lever 13 is connected further to the box-like containment body 2.

The base 3 of the brewing unit 1 is constituted by a hollow body that defines a compartment 15 accommodating the capsule 11, this compartment being open on top and comprising a bottom wall 16. The compartment 15 is adapted to act as the brewing chamber for the preparation of the beverage. Said bottom wall 16 is provided with a plurality of projections 17 that are so shaped as to be able to pierce the material forming the capsule 11. Each one of said projections 17 comprises an opening enabling the beverage to flow out towards means 18 connecting the brewing chamber to the beverage dispensing point. The bottom wall 16 is made in such a manner as to be capable of serving as a filter during the outflow of the beverage from the brewing chamber.

Within the hollow body of said base 3, and along the longitudinal axis thereof, there is slidably mounted a bar 19 that causes the capsule to be ejected from the compartment 15 in which it is accommodated. This bar 19 comprises a first end portion 20 in contact with the upper contour 10 of the ejection lever 9, and a second end portion 21 that faces into the compartment 15 at the bottom wall 16 thereof. The movement of this bar 19 is opposed by a second spring 26 connected to the base 3.

The base 3 is rotatably mounted onto the box-like containment body 2 and comprises a pin 22 engaging a first guiding profile 23 that is firmly joined to the connecting rod 6 and suitable sized and shaped so as to coordinate the movement of the base 3 with the movement of the brewing head 4 and, in particular, to bring about a rotation of the base 3 when the connecting rod 6 and, as a result, also the brewing head 4 are displaced due to the movement of the crank 5. The base 3 is capable of moving between a first position, in which the capsule 11 is loaded into the receiving compartment 15, and a second position, in which the beverage is brewed. Said first position is such that the compartment 15 is moved to a position in which it is facing the outlet aperture of a feeding conveyor 24 designed to dispense the capsule being stored in a proper reservoir (not shown). Said second position, on the other hand, is such that the receiving compartment 15 is moved into a position in which it is facing the brewing head 4. In order to ensure that the base 3 will correctly and accurately stop at the above-described end positions thereof, the pin 22 is designed to further engage a second curvilinear guiding profile 25.

The brewing head 4, which forms a hydrodynamic actuation unit, comprises a hollow containment structure 27, in which there is mounted in a tightly sealed manner a first hollow piston 28 that is movable relative to the same structure 27. Within this first piston 28 there is mounted, again in a tightly sealed manner, a second piston 29 that is movable relative to said first piston 28, the movement of this second piston being opposed by elastic means 30 connected to the hollow containment structure 27. The second piston 29 extends along the longitudinal axis thereof so as to form a hollow interspace 33, which is associated to means 32 for letting pressurized water into the compartment 15 acting as a brewing chamber. The second piston 29 is provided with a circumferential edge that is so shaped and made as to be able to pierce the material forming the capsule 11 when an appropriate pressure is exerted on the capsule 11 by the same piston 29. The bottom surface 31 of the second piston 29 comprises a plurality of apertures (not shown in GIG. 1) that are provided in order to enable the water to enter the compartment 15.

To the containment structure 27 there is connected a conduit 34 within which there moves a fluid under pressure, which in this way directly controls the movement of the first and the second piston 28 and 29. This movement of said pistons is practically imparted by said fluid under pressure being injected into or extracted from the interstices comprised between the containment structure 27 and the first piston 28, as well as the interstices comprised between the first piston 28 and the second piston 29. The above-mentioned fluid may be in its liquid state or in its gaseous state, but is preferably constituted by the water flowing in from the same source used to produce the beverage. The fluid itself is put under pressure by an appropriate apparatus, such as for instance a pump or a compressor.

The direction of the relative displacement of the second piston 29 with respect to the first piston 28 is determined by the direction of the force resulting between the action of said elastic means 30 and said direct action of the fluid under pressure; in particular, the movement of the second piston 29 starts when the pushing force exerted thereunto by the fluid under pressure exceeds the biasing force of the elastic means 30. Should for any reason whatsoever an overpressure condition occur within the above-mentioned interstices, the pressurized fluid is allowed to flow out through a safety bleeder 35 so as to collect into a reservoir (not shown).

Accordingly, the way in which the unit according to the present invention operates is as follows.

Figure 2:
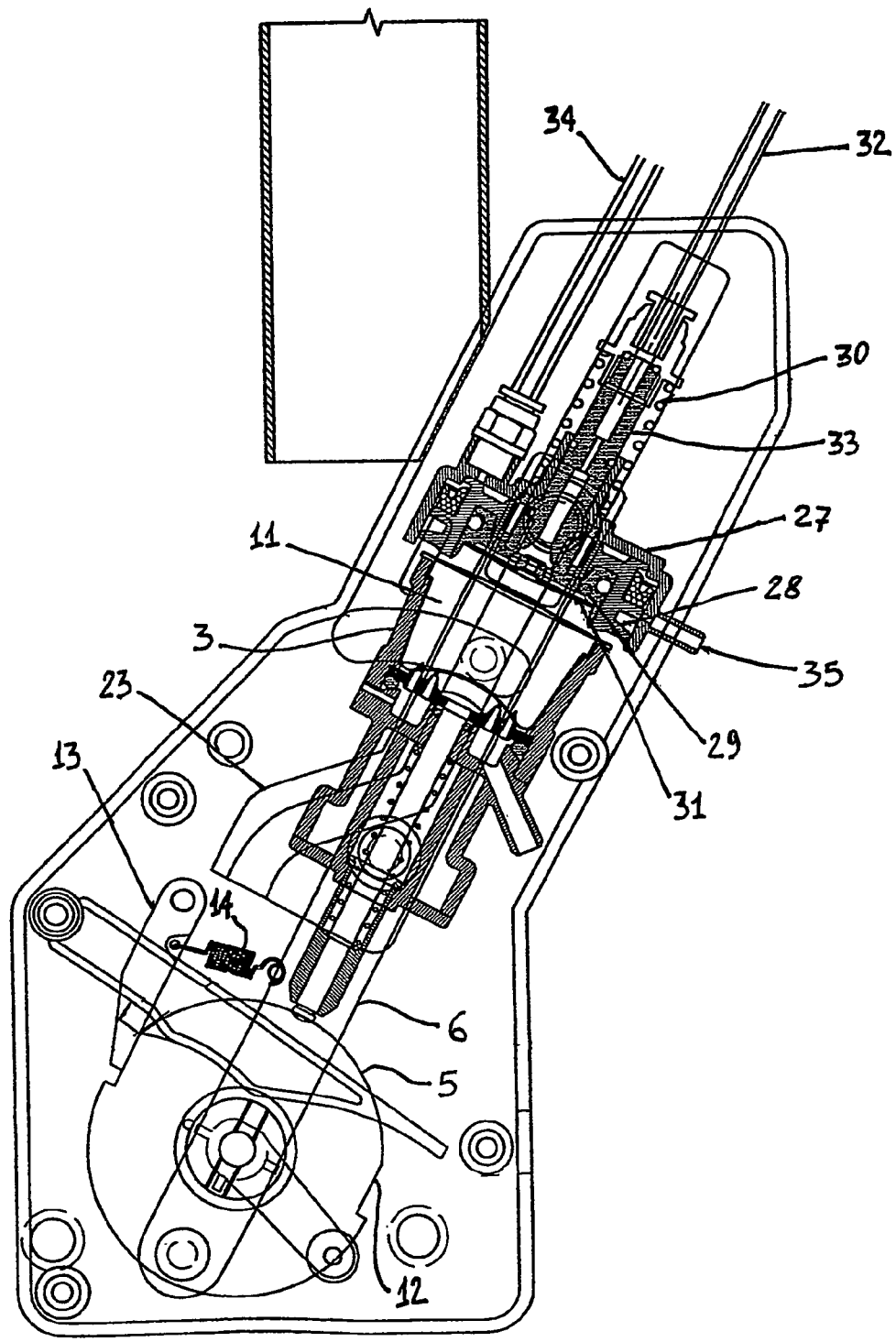
FIG. 2 is a cross-sectional view of the brewing unit shown in FIG. 1, but in a second operating phase thereof.
Figure 3:
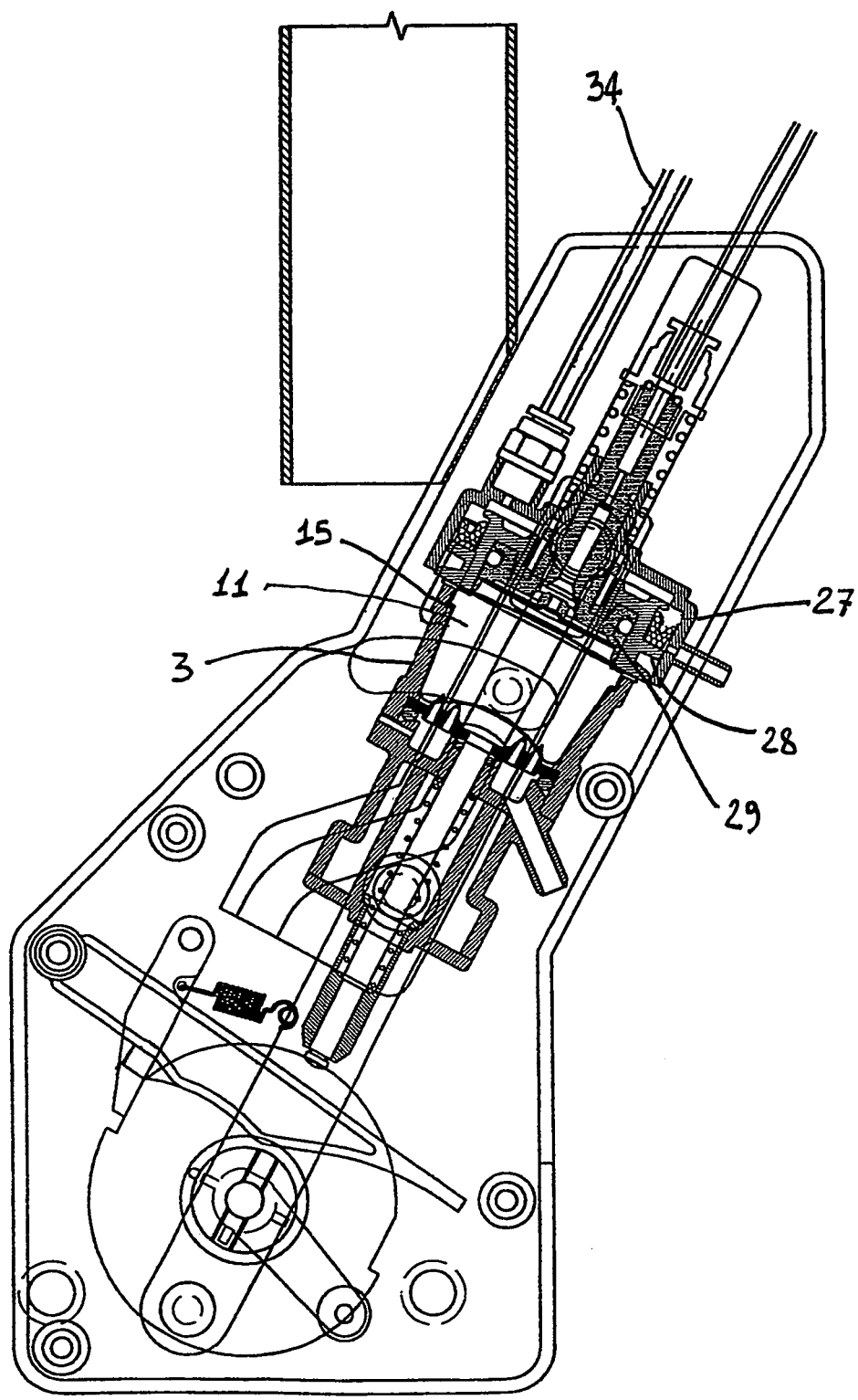
FIG. 3 is a cross-sectional view of the brewing unit shown in FIG. 1, but in a third operating phase thereof.

With reference to FIGS. 1 and 2, after the capsule 11 coming from the feeding conveyor 25 has occupied the receiving compartment 15, the rotation of the crank 5 and the associated cam 7 in the direction indicated by the arrow F causes the base 3 to rotate and the brewing head 4 to descend along the first guiding profile 23. The travelling length of the brewing head 4 is so sized and designed as to ensure that the brewing head itself is able to move all along until it comes quite close to the base 3, however without coming into contact therewith (FIG. 2). When the brewing head 4 has covered the entire allowable travelling length thereof, the detent lever 13 slides into and engages one of the recesses 12 so as to prevent the brewing head 4 from possibly moving away from the base 3 accidentally. At this point, as is best shown in FIG. 3, a fluid under pressure is injected through the conduit 34 into the interstices comprised between the containment structure 27 and the first piston 28, thereby bring about a displacement of said structure 27 and said first piston 28 relative to each other, this relative movement continuing until said first piston 28 eventually comes into contact with the base 3 and the capsule 11. The pushing action exerted by the fluid under pressure contributes to the compartment 15 being at this point closed and sealed hermetically, so that it can now act as the brewing chamber. As the fluid under pressure keeps being injected through the conduit 34 (FIG. 4), the same fluid eventually fills up those interstices that are comprised between the first piston 28 and the second piston 29, thereby overcoming the contrasting action exerted by the elastic means 30. The second piston 29 slides relative to the first piston 28 and moves to occupy a portion of the compartment 15 with the bottom surface 31 thereof. In this way, the circumferential edge of the second piston 29, as it is pressed against the capsule 11 by the action of the fluid under pressure, pieces the upper surface thereof, while the piston's bottom surface 31 urges the same capsule 11 towards the bottom wall 16 of the base 3, thereby causing the capsule itself to be further pierced by the projections 17.

Upon the capsule 11 having been so pierced, and as the fluid under pressure keeps being present in the conduit 34, water under pressure is let into the compartment 15 via the means 32 connected to the hollow interspace 33. This pressurized water comes into contact with the raw material contained in the capsule 11, thereby forming a beverage that is capable of flowing out of the compartment 15 through the apertures provided in the projections 17, and running towards the connecting means 18 to the dispensing point.

Figure 4:
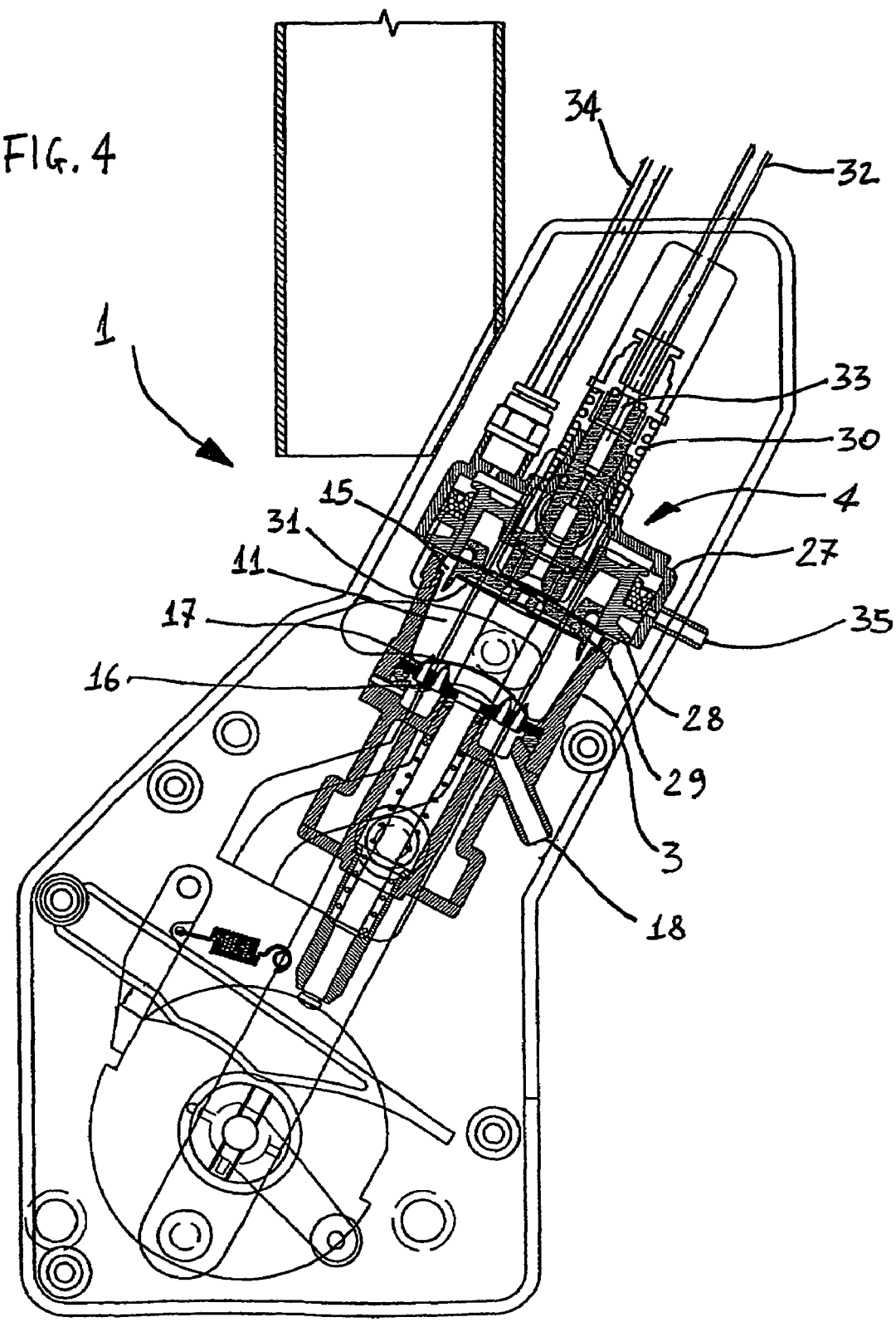
FIG. 4 is a cross-sectional view of the brewing unit shown in FIG. 1, but in a fourth operating phase thereof.

Then, when the desired amount of water under pressure has flown through the capsule 11 and left the compartment 15, i.e. when the desired dose of beverage is reached, the process for ejecting the exhausted capsule 11 is started. In the position in which the base 3 and the brewing head 4 are lying at this point, i.e. the position in which the brewing head 4 is engaging the base 3, as illustrated in FIG. 4, while the fluid in the conduit 34 continues being kept under pressure, the water still present within the capsule 11 is removed by sucking it up through the means 32, thereby preventing the water and raw material mixture still remaining in the capsule 11 from being able to spill out from the capsule and soil the brewing unit 1. Next, the fluid under pressure is extracted through the conduit 34 from the interstices between the first piston 28 and the second piston 29, as well as those between the containment structure 27 and the first piston 28, so that said pistons are able to slide backwards, thereby retracting into the containment structure 27 and making in this way the base 3 independent of the brewing head 4.

Figure 5:
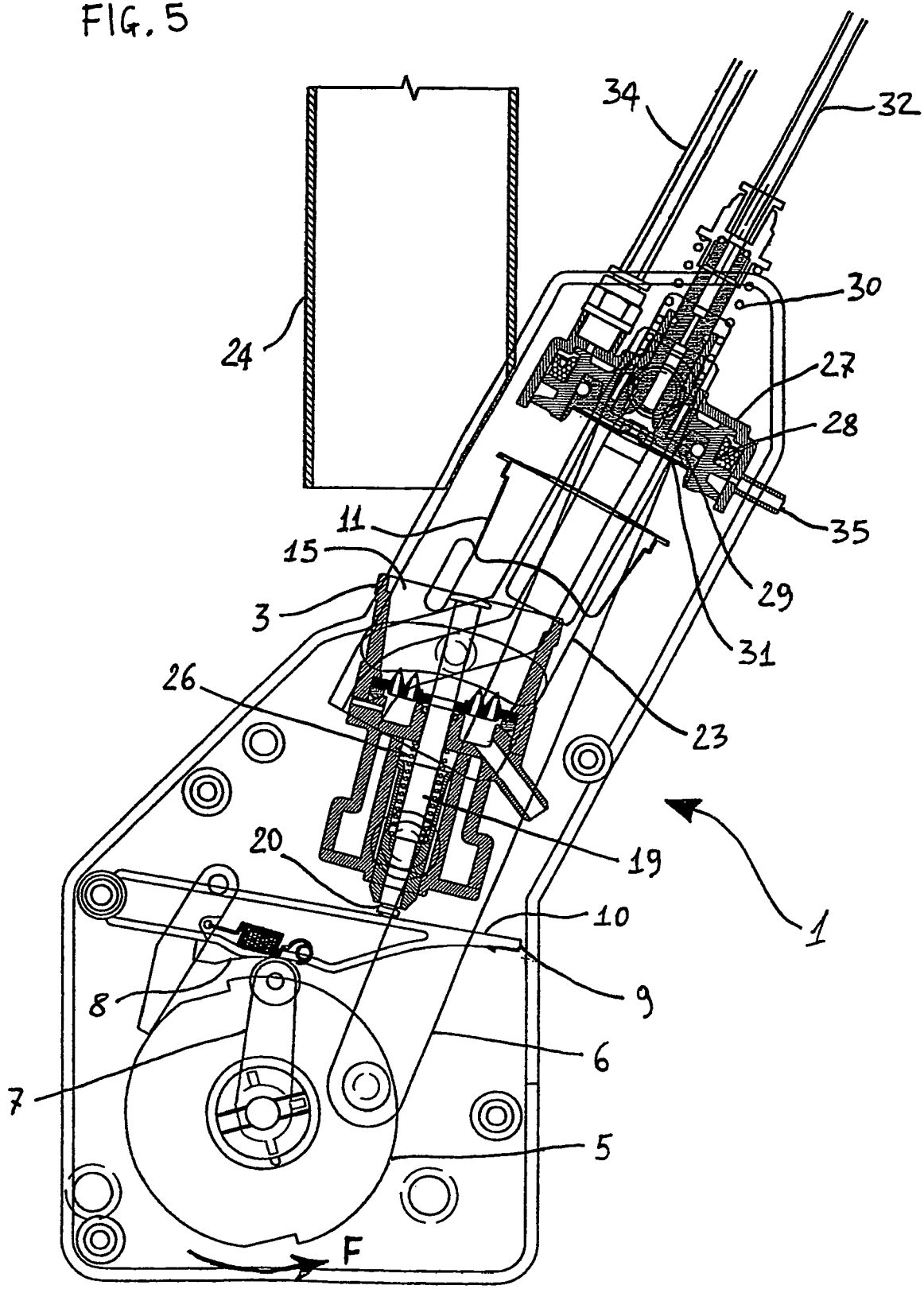
FIG. 5 is a cross-sectional view of the brewing unit shown in FIG. 1, but in a fifth operating phase thereof.

Upon such retraction having been so completed, the crank 5 and the cam 7 firmly associated therewith are operated again the rotate in the direction indicated by the arrow F (FIG. 5), thereby causing the base 3 to rotate accordingly and, at the same time, the brewing head 4 to move away from the base 3 along the first guiding profile 23. During the rotation of the crank 5, and prior to the base 3 completing its movement, the same 7 comes into contact with the lower contour 8 of the ejection lever 9, which, via the upper contour 10 thereof, actuates the bar 19 so as to cause it to enter the compartment 15, thereby causing the capsule 11 to be ejected from the base 3. The action of this bar is most clearly illustrated in FIG. 5.

Upon conclusion of the rotation of the crank 5, the base 3 comes to lie in a position in which it faces the outlet aperture of the feeding conveyor 24, whereas the brewing head 4 moves back into the resting position thereof, as illustrated in FIG. 1. At this point, the brewing unit 1 is ready to start a new cycle for producing another beverage.

Fully apparent from the above description is therefore the ability of the the present invention to effectively reach the afore cited aims and advantages by providing a brewing unit that is capable of operating effectively, although not limitatively, with capsules of the hermetically sealed type. Moreover, it is fully apparent that the operation of the brewing unit of the present invention, due to the use of a hydrodynamic actuating system, is fully independent of manufacturing and assembly tolerances of the various mechanical component parts, as well as of the progressing wear and tear of the materials which said component parts are made of, the brewing unit itself being so sized and designed as to be extremely compact and capable of being accommodated in a beverage vending machine of the usual kind.

It should be noticed that the materials used, as well as the shapes and the sizing of the individual items, may each time be selected so as to more appropriately meet the particular requirements or suit the particular application, without departing from the scope of the present invention.

The various component parts entering the construction of the brewing unit according to the present invention shall certainly not be provided solely in the afore illustrated embodiments, but may rather be used or implemented in a number of different embodiments, again without departing from the scope of the present invention.

The invention claimed is:

1. A mechanically and hydrodynamically operated brewing unit for automatic beverage vending machines, said brewing unit comprising:
    a rotatable base provided with a compartment adapted to act as a brewing chamber, said compartment being open on top and comprising a bottom wall;
    means to let water under pressure into said compartment;
    connecting means for conveying brew to a beverage dispensing point; and
    a brewing head movable relative to the rotatable base by means of a crank-connecting rod mechanism, said brewing head comprising:
        a hollow containment structure;
        a first hollow piston housed within said hollow containment structure movably relative thereto, wherein a first interstice is provided between the first piston and the hollow containment structure;
        a second piston housed within said first piston movably relative thereto, wherein a second interstice is provided between the first piston and the second piston; and
        elastic means opposing the movement of said second piston,
    wherein the first interstice and the second interstice are both hydraulically connected to a fluid supply means provided for operating said first and second pistons by the direct action of a fluid under pressure.

2. The brewing unit according to claim 1, wherein the movement of said rotatable base and said brewing head are controlled and brought about by a kinematic chain of mechanical members.

3. The brewing unit according to claim 2, wherein said mechanical members comprise said crank-connecting rod mechanism, a detent lever, and a first guiding profile that coordinates the movement of said rotatable base with the movement of said brewing head.

4. The brewing unit according to claim 1, wherein said second piston is provided with a circumferential edge that is shaped and made so as to be able to pierce the material which a hermetically sealed capsule is made of.

5. The brewing unit according to claim 1, wherein the direction of displacement of the second piston relative to the first piston is determined by the direction of the force resulting between the action of the elastic means and said direct action of the fluid under pressure.

6. The brewing unit according to claim 1, wherein said bottom wall comprises a plurality of projections, each one of said projections comprising an aperture.

7. The brewing unit according to claim 1, wherein said fluid under pressure moves within a conduit connected to the containment structure.

8. The brewing unit according to claim 1, wherein said containment structure comprises a safety bleeding provision.

9. The brewing unit according to claim 1, wherein said fluid under pressure is in its liquid state or in its gaseous state.

10. The brewing unit according to claim 2, wherein said second piston is provided with a circumferential edge that is shaped and made so as to be able to pierce the material which a hermetically sealed capsule is made of.

11. The brewing unit according to claim 3, wherein said second piston is provided with a circumferential edge that is shaped and made so as to be able to pierce the material which is hermetically sealed capsule is made of.

12. The brewing unit according to claim 2, wherein the direction of displacement of the second piston relative to the first piston is determined by the direction of the force resulting between the action of the elastic means and said direct action of the fluid under pressure.

13. The brewing unit according to claim 3, wherein the direction of displacement of the second piston relative to the first piston is determined by the direction of the force resulting between the action of the elastic means and said direct action of the fluid under pressure.

14. The brewing unit according to claim 4, wherein the direction of displacement of the second piston relative to the first piston is determined by the direction of the force resulting between the action of the elastic means and said direct action of the fluid under pressure.

15. The brewing unit according to claim 2, wherein said bottom wall comprises a plurality of projections, each one of said projections comprising an aperture.

16. The brewing unit according to claim 3, wherein said bottom wall comprises a plurality of projections, each one of said projections comprising an aperture.

17. The brewing unit according to claim 4, wherein said bottom wall comprises a plurality of projections, each one of said projections comprising an aperture.

18. The brewing unit according to claim 5, wherein said bottom wall comprises a plurality of projections, each one of said projections comprising an aperture.

19. The brewing unit according to claim 2, wherein said fluid under pressure moves within a conduit connected to the containment structure.

* * * * *